(12) United States Patent
Sator et al.

(10) Patent No.: US 6,678,094 B2
(45) Date of Patent: Jan. 13, 2004

(54) APPARATUS FOR LETTERING OR MARKING ARTICLES BY MEANS OF A LASER BEAM

(75) Inventors: Alexander P. Sator, Hamburg (DE); Walter Czarnetzki, Meddewade (DE); Helmut Krafzick, Hamburg (DE)

(73) Assignee: Sator Laser GmbH, Hamburg (DE)

( * ) Notice: Subject to any disclaimer, the term of this patent is extended or adjusted under 35 U.S.C. 154(b) by 43 days.

(21) Appl. No.: 10/054,757

(22) Filed: Jan. 22, 2002

(65) Prior Publication Data

US 2002/0097499 A1 Jul. 25, 2002

(30) Foreign Application Priority Data

Jan. 24, 2001 (DE) ...................... 201 01 247 U

(51) Int. Cl.$^7$ .......................... G02B 27/14; B41J 2/435; B23K 26/18
(52) U.S. Cl. ................... 359/635; 347/248; 219/121.69
(58) Field of Search ............ 219/121.75, 121.6–121.86; 359/642, 635, 710, 717, 691, 646, 206, 207, 210, 211, 205; 351/177, 160; 347/248

(56) References Cited

U.S. PATENT DOCUMENTS

| 4,912,298 A | * | 3/1990 | Daniels et al. ......... 219/121.69 |
| 4,947,022 A | * | 8/1990 | Ostroff et al. ......... 219/121.68 |
| 5,326,956 A | * | 7/1994 | Lunney ................. 219/121.69 |
| 5,701,190 A | * | 12/1997 | Mochizuki .................. 359/205 |
| 6,016,227 A | * | 1/2000 | Hopkins et al. ............. 359/668 |
| 6,469,729 B1 | * | 10/2002 | Ryan ......................... 347/248 |

* cited by examiner

Primary Examiner—Georgia Epps
Assistant Examiner—William Choi
(74) Attorney, Agent, or Firm—Faegre & Benson LLP

(57) ABSTRACT

An apparatus for lettering or marking articles by means of a laser beam, comprising a laser to produce a laser beam and a focussing optical system to produce a larger radiation density on the surface of the article wherein a lens system is provided the focussing plane of which constitutes an area which is curved away from the lens system.

1 Claim, 1 Drawing Sheet

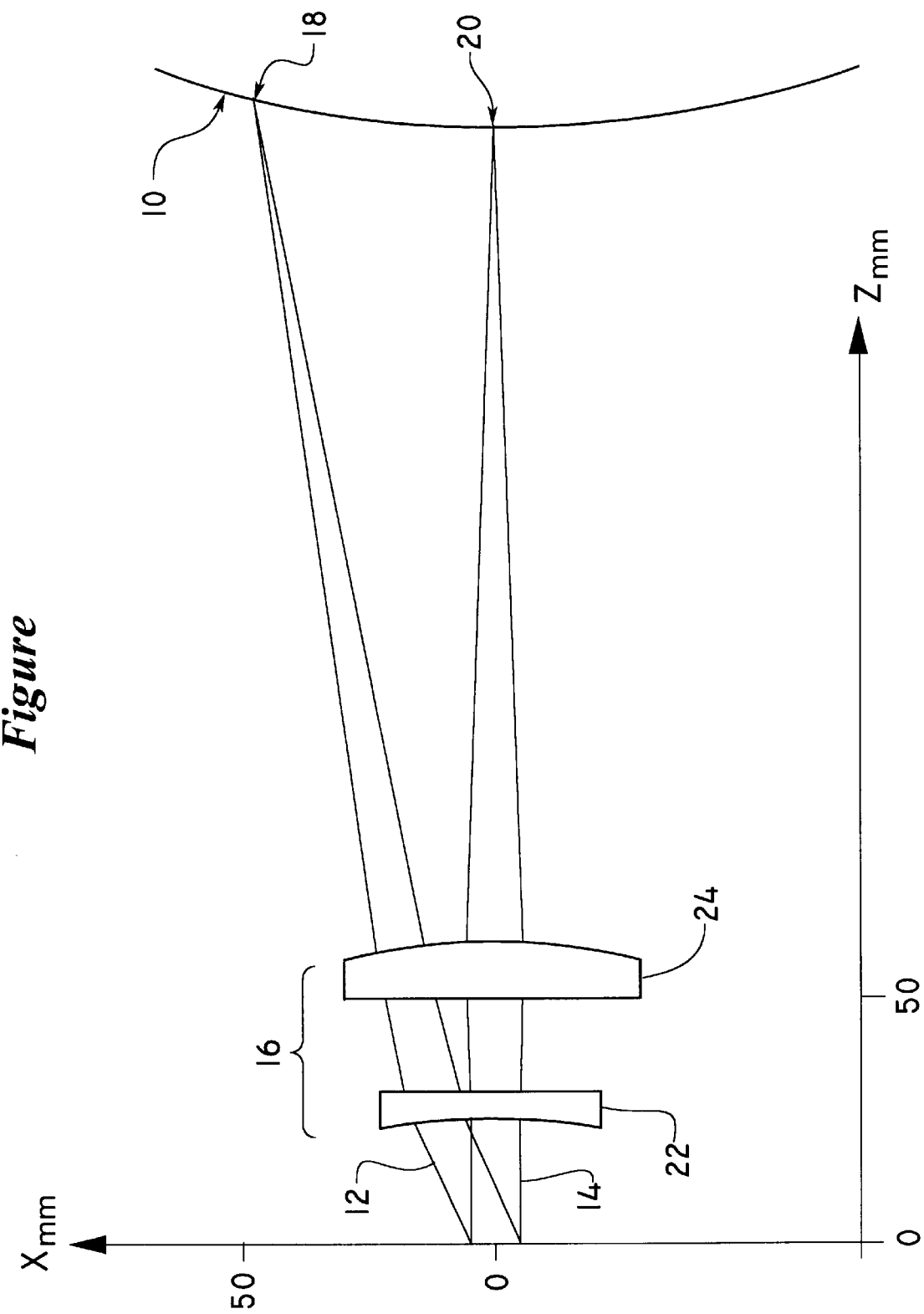

APPARATUS FOR LETTERING OR MARKING ARTICLES BY MEANS OF A LASER BEAM

CROSS REFERENCE TO RELATED APPLICATION

This application claims priority under 35 U.S.C. 119 to German Patent Application No. 20101247.2, filed in the German Patent Office on Jan. 24, 2001.

BACKGROUND OF THE INVENTION

The invention relates to an apparatus for lettering or marking articles by means of a laser beam.

It has been known for a rather long time to mark articles, particularly packaging materials, by using laser beams. Scanning systems or mask-employing systems may be used for this purpose. In the former case, two rotary mirrors are arranged at right angles to each other to enable the deflected laser beam to sweep over each point of a two-dimensional area. The mask-employing system passes a laser beam through a mask in a pulse-like manner to produce the lettering or marking in a single operation.

It is known to focus the light beam onto the surface of the workpiece with a view to achieving higher power densities and better lettering qualities, as a result. So-called F-Theta optical systems are employed for this purpose. These possess a planar focal area so that the variation in spacing is compensated by the focal area, which normally is spherically symmetrical, particularly at the borders of the plane being lettered.

Another possible way to vary the length of focus in a way depending on the solid angle of the deflected laser beam is to mechanically vary the focal length of the lens system. This requires to mechanically move the lenses, which involves a considerable expenditure in equipment.

SUMMARY OF THE INVENTION

It is the object of the invention to provide an apparatus for lettering or marking articles that have a cylindrical surface.

According to the invention, the object is attained by a lens system the focusing plane of which constitutes an area which is curved away from the lens system.

Various possible ways are imaginable to conceive such a lens system. According to an aspect of the invention, the lens system has a first, defocusing lens and a second, focussing lens. According to another aspect of the invention, the defocusing lens has a slightly concave/plane lens and the second lens has a plano/convex or slightly concave/convex lens. According to a further aspect of the invention, the second lens is formed as a cylindrical lens. When cylindrical surfaces are lettered the spacing between the surface and the lens system will vary with the curvature of the cylindrical surface. The cylindrical surface forms a straight line perpendicularly thereto in one direction each. It is understood that the lens system will take account of this circumstance.

BRIEF DESCRIPTION OF THE DRAWING

The single FIGURE shows a lens assembly according to the invention which uses two laser beams for lettering or marking a cylindrical surface.

DETAILED DESCRIPTION

An article which is not shown in detail, e.g. a bottle, has a surface 10 the curvature of which is in the plane of the drawing. Two laser beams 12 and 14 are shown which originate from a laser or deflection mirror. The X axis, for example, may lie in the surface of the deflection mirror. The laser beam 12 or 14 has a certain extension in width. It penetrates through a lens system 16 which focuses the laser beams 12, 14 on the surface 10 as is shown at 18 and 20, respectively. However, the laser beams 12, 14 not only undergo a deflection in the plane of the drawing, but also in a direction perpendicular thereto. Such a deflection for lettering or marking by means of a deflection mirror is generally known, however.

The lens system 16 has a first, slightly concave/plane lens 22 and a second, plano/convex lens 24 behind it, which is formed as a cylindrical lens in the section shown, but is a normal convex lens in a direction perpendicular thereto. The refractive index of the lens 22 is smaller than that of the lens 24. The first lens 22 has a defocusing effect and the second one has a focussing effect. Anyway, the assembly of the lenses 22, 24 is such as to focus these on the surface 10 whatever the solid angle of the laser beams 12, 14 is.

Basically, however, the principle depicted in the above description is also applicable to so-called mask systems in which a mask preduced by punching in a mirror-image manner will form the article to be marked. Finally, it is also possible to letter areas moving on a cylindrical surface. To this effect, the speed of the moved marking field is compensated by an appropriate control on the scanner while lettering is effected.

What is claimed is:

1. An apparatus for lettering or marking articles by means of a laser beam, comprising a laser to produce a laser beam and a focusing optical system to produce a higher radiation density on the surface of the article, characterized in that a lens system is provided the focusing plane of which constitutes a surface which is curved away from the lens system, wherein the lens system has a first lens and a second lens, with the refractive index of the first lens smaller than that of the second lens, and the first lens is a slightly concave/plane defocusing lens and the second lens is a plane/convex or slightly concave/convex focusing lens formed as a cylindrical lens.

* * * * *